M. G. EDINGTON & C. W. CAMPBELL.
SILO STAVE MOLD.
APPLICATION FILED APR. 16, 1914.

1,125,986.

Patented Jan. 26, 1915.

WITNESSES:
L. B. Woerner
D. L. Larson

INVENTORS,
Melvin G. Edington &
Charles W. Campbell
By Minturn & Woerner
Attorneys.

UNITED STATES PATENT OFFICE.

MELVIN G. EDINGTON, OF LYONS, AND CHARLES W. CAMPBELL, OF BICKNELL, INDIANA.

SILO-STAVE MOLD.

1,125,986.  Specification of Letters Patent.  Patented Jan. 26, 1915.

Application filed April 16, 1914. Serial No. 832,346.

*To all whom it may concern:*

Be it known that we, MELVIN G. EDINGTON, residing at Lyons, Greene county, Indiana, and CHARLES W. CAMPBELL, residing at Bicknell, Knox county, Indiana, both citizens of the United States, have invented certain new and useful Improvements in Silo-Stave Molds, of which the following is a specification.
The object of our invention is to provide a simple, inexpensive, durable and easily operated mold for forming the staves of silos with suitable beveled vertical edges to conform to the cylindrical shape of the wall to be made from them, and to provide longitudinal grooves for locking purposes in said beveled edges, and also corresponding grooves in the top and bottom edges of the staves.
A further object of the invention is to provide a separable mold which is adapted to fully release the product for removal from the mold, and to provide suitable indentures for securely gripping the finished stave while handling it during the construction of the silo.

We accomplish the above and other objects which will hereinafter appear, by the mechanism illustrated in the accompanying drawing, in which—

Figure 1:
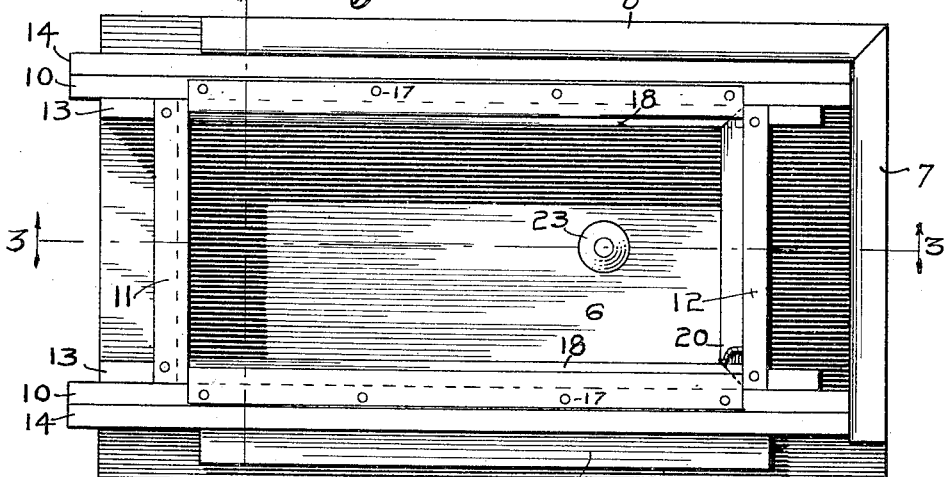
Figure 2:
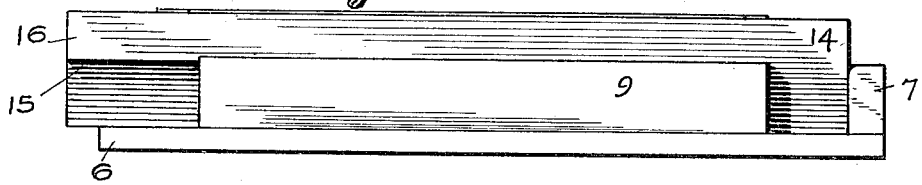
Figure 3:
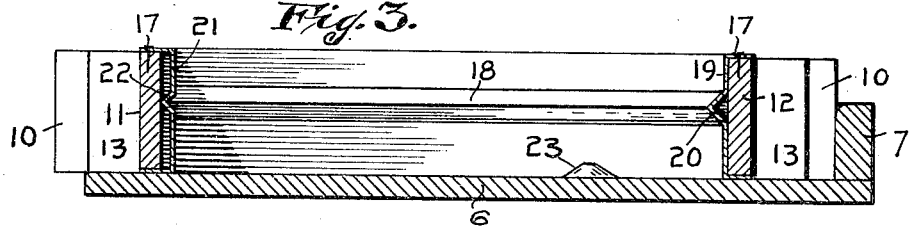
Figure 4:
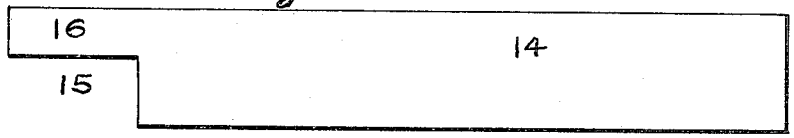
Figure 5:
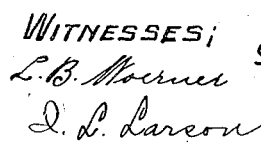

Figure 1 is a top plan view of our silo stave mold in position to receive the material for molding the stave. Fig. 2 is a view in side elevation of same. Fig. 3 is a longitudinal vertical section on the line 3—3 of Fig. 1. Fig. 4 is a side view of one of the locking bars detached from the other parts of the mold, and Fig. 5 is a vertical cross section on the line 5—5 of Fig. 1.
Like characters of reference indicate like parts throughout the several views of the drawing.

The flat bottom or base 6 of the mold is provided with a fixed vertical end 7 and opposing sides 8 and 9 which afford suitable stops and bearings for the removable mold members. The vertical side members 10 have their inner ends in contact with the end 7 and their opposite ends preferably project sufficiently beyond the bottom 6 to afford suitable hand-holds for securely grasping them for placing and removal.

A pair of transverse mold members 11 and 12 extend at suitable distances from each other, depending upon the length of the stave, between the two side members 10, and the outward movement of the members 11 and 12 is prevented by bearing blocks 13 which are fastened rigidly to the members 10, and the members 10 are held firmly against the ends of the members 11 and 12, during the operation of molding, by the removable locking bars 14. These latter are of suitable proportions to make a close sliding fit between the sides 8 and 9 and their respective adjacent mold members 10, and in assembling the mold for use, after the parts 10, 11 and 12 are positioned as shown in Fig. 1, the locking bars 14 are then pushed down between the members 10 and their respective holding sides 8 and 9. The inner ends of locking bars 14 are intended to contact with the end 7 and the opposite ends of said bars are provided with undercuts 15, for a suitable distance in from said ends, to afford finger grasping spaces below, or in other words to provide a convenient handle 16 for placing but more particularly for removing said locking bars.

All of the parts thus far described are preferably made out of wood and are thoroughly impregnated with oil to prevent the absorption of moisture by them during the application of the wet material from which the silo staves are made. The silo stave will be formed out of materials which are well known and commonly used for such purposes, and which are introduced into the mold in a plastic condition resulting from the presence of an excess of water at that initial period.

The inner sides of the members 10 are covered with sheet metal 16, preferably galvanized iron, the upper and lower edges of which are bent to horizontal planes and overlap the top and bottom edges of the members 10, and are secured to the latter by nails 17. The sheet metal walls 16 are oblique to each other, as clearly shown in Fig. 5, for the purpose of giving the required bevel or miter to the vertical edges of the finished stave necessary to cause the staves to fit together properly when assembled in the cylindrical walls of a silo.

As we prefer to form the staves with longitudinal V-shaped grooves in their vertical edges to assist in assembling them by the introduction of an improved clip of our invention therein, and also to increase the mortar-space or bond, we provide a correspondingly V-shaped rib or corrugation 18, extending longitudinally of the wall 16, as shown. This is formed by pressing the sheet metal into the desired shape.

The ends 11 and 12 are likewise covered on their inner faces with sheet metal having turned edges which are secured to the edges of the corresponding ends by nails 17. The sheet metal wall 19 for the end 12 is provided with a V-shaped corrugation 20, similar to the V-shaped corrugation 18 of the side walls 16, and is for the purpose of forming a V-shaped channel in the end of the stave. The sheet metal wall 21 for the end 11 is provided with an inturned V-shaped corrugation 22, for the purpose of forming an angular projection or rib on the lower end of the stave, which rib will be seated in the groove in the top of the stave below when the latter are assembled in the silo. Both ends of the corrugation 22 are filled in past the walls 16 so as to keep the plastic material of the stave being formed, from leaking out through said corrugation, and also shortening the resulting rib on the stave, at each end, whereby a better bond is secured in the silo wall.

The bottom, or pallet 6 of the mold is provided with a conical projection 23 which forms an indent in the finished stave to provide a hold for grasping-irons in handling the stave in laying the silo walls.

Assuming the mold to be in the position shown in the drawings, ready to receive the plastic material to be formed into a stave, it is filled to a level with the top edges or above and the excess is scraped off by using the top of the mold as a guide to the scraper. The locking bars 14 are then withdrawn on each side of the mold, which releases the side members 10. The latter are then separated from the product, and may be removed if desired, or allowed to remain against their respective outside walls 8 and 9. This leaves the ends 11 and 12 released and they are removed and the newly molded silo stave is thus freed from the mold and can be taken therefrom and dried in the usual manner.

While we have described our invention with more or less minuteness as regards details of construction and arrangement and as being embodied in certain precise forms, we do not desire to be limited thereto unduly or any more than is pointed out in the claims. On the contrary, we contemplate all proper changes in form, construction, and arrangement, the omission of immaterial elements, and the substitution of equivalents, as circumstances may suggest or necessity render expedient.

We claim:—

1. In a silo stave mold, a pallet having two fixed sides and a fixed end and an intermediate upward projection, a pair of removable side members contacting with said fixed end, a pair of removable end members, means for holding the side and end members in fixed relation to each other, said side and end members being made out of wood, sheet metal inner walls for each of said removable side and end members, the metal walls of the side members being oblique to their adjacent side members and said oblique walls having middle corrugations turned away from the adjacent side walls, and the metal walls of the end members having longitudinal middle corrugations one of which is turned inwardly toward the adjacent end member and the other of which is turned away from the adjacent end wall and locking means between each pair of said fixed and removable side members.

2. In a silo stave mold, a pallet having two fixed sides and an intermediate upward projection, a pair of removable wooden side members, a pair of removable wooden end members between said side members, sheet metal inner walls for each of said inner side and end members, the metal walls of the side members being oblique to the adjacent side members resulting in inward projections forming inner stops for said end members, outside stops on the removable side members for said removable end members, and locking means between each pair of fixed and removable side members.

3. In a silo stave mold, a pallet having two fixed sides and a fixed end and an intermediate upward projection, a pair of removable wooden side members, a pair of removable wooden end members between said removable side members, sheet metal inner walls for each of said inner side and end members, the metal walls of the side members being oblique to the adjacent side members and having middle inwardly extending corrugations and the end members having middle corrugations, one of which extends inwardly and the other outwardly, the inward projections of said side metal walls forming inner stops for said wooden end members, outside stops on the removable side members for said end members, and locking means between each pair of said fixed and removable side members.

In witness whereof, we have hereunto set our hands and seals at Lyons, Indiana, this 31st day of March, A. D. one thousand nine hundred and fourteen.

MELVIN G. EDINGTON. [L. S.]
CHARLES W. CAMPBELL. [L. S.]

Witnesses:
JONATHAN L. HINMAN,
J. S. SIMONS.